United States Patent
Diemer et al.

(10) Patent No.: US 8,011,261 B2
(45) Date of Patent: Sep. 6, 2011

(54) MULTI-SPEED TRANSMISSION WITH COUNTERSHAFT GEARING ARRANGEMENT

(75) Inventors: John A. Diemer, Farmington Hills, MI (US); James D. Hendrickson, Belleville, MI (US); Patrick S. Portell, Pinckney, MI (US); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 811 days.

(21) Appl. No.: 11/971,380

(22) Filed: Jan. 9, 2008

(65) Prior Publication Data

US 2008/0178696 A1  Jul. 31, 2008

Related U.S. Application Data

(60) Provisional application No. 60/898,077, filed on Jan. 29, 2007.

(51) Int. Cl.
F16H 3/087 (2006.01)
(52) U.S. Cl. .......................................... 74/330
(58) Field of Classification Search ....................... 74/330
See application file for complete search history.

(56) References Cited

U.S. PATENT DOCUMENTS

| | | | |
|---|---|---|---|
| 4,565,102 A | 1/1986 | Miyahara et al. | |
| 7,044,014 B2 | 5/2006 | Janson et al. | |
| 7,077,025 B2 | 7/2006 | Janson et al. | |
| 7,082,850 B2 | 8/2006 | Hughes | |
| 7,255,018 B2 | 8/2007 | Gumpoltsberger | |
| 7,311,015 B2 | 12/2007 | Kluge | |
| 7,313,981 B2 | 1/2008 | Gumpoltsberger | |
| 7,384,374 B2 | 6/2008 | Jiang | |
| 7,387,590 B2 | 6/2008 | Dreher | |
| 7,421,919 B2* | 9/2008 | Gumpoltsberger et al. | 74/330 |
| 7,434,487 B2 | 10/2008 | Terai | |
| 7,437,963 B2 | 10/2008 | Haka et al. | |
| 7,461,567 B2 | 12/2008 | Ogami | |
| 7,462,121 B2* | 12/2008 | Janson et al. | 475/5 |
| 7,472,617 B2 | 1/2009 | Nicklass | |
| 7,500,411 B2* | 3/2009 | Gumpoltsberger | 74/329 |
| 2005/0103140 A1 | 5/2005 | Gumpoltsberger et al. | |
| 2006/0048594 A1 | 3/2006 | Gumpoltsberger et al. | |
| 2006/0169076 A1 | 8/2006 | Gumpoltsberger et al. | |
| 2006/0169077 A1 | 8/2006 | Gitt | |
| 2006/0225527 A1 | 10/2006 | Yang et al. | |
| 2007/0113696 A1 | 5/2007 | Haka et al. | |
| 2008/0134817 A1 | 6/2008 | Bjorck et al. | |
| 2008/0161154 A1 | 7/2008 | Bjorck et al. | |
| 2008/0271555 A1 | 11/2008 | Patzner | |

FOREIGN PATENT DOCUMENTS

| | | |
|---|---|---|
| DE | 103 43 995 A1 * | 5/2005 |
| DE | 10343995 A1 | 5/2005 |
| DE | 102004020955 A1 | 12/2005 |
| DE | 102004055121 A1 | 5/2006 |
| DE | 102006015661 A1 | 10/2007 |
| EP | 1936234 A1 | 10/2007 |

* cited by examiner

*Primary Examiner* — Sherry Estremsky

(57) ABSTRACT

A transmission is provided having a dual clutch to achieve torque flow through a countershaft gearing arrangement. The countershaft gearing arrangement includes a plurality of coplanar gear sets having gears that are selectively connectable to a countershaft. A transfer gear set transfers torque from the countershaft to an output shaft. The output shaft is connected to a final drive unit that has a final drive unit output shaft that is transverse to an input member connected at one end to a torque converter and at the other end to the dual clutch.

25 Claims, 2 Drawing Sheets

MULTI-SPEED TRANSMISSION WITH COUNTERSHAFT GEARING ARRANGEMENT

CROSS-REFERENCE TO RELATED APPLICATIONS

This application claims the benefit of U.S. Provisional Application No. 60/898,077, filed on Jan. 29, 2007. The disclosure of the above application is incorporated herein by reference.

TECHNICAL FIELD

The present disclosure relates to transmissions, and more particularly to a multiple speed transmission having a dual clutch assembly and a countershaft.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

The addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY

In an aspect of the present invention a powertrain having a transmission input member, a power source for generating a torque in the input member, a first interconnecting shaft, a second interconnecting shaft concentric with the first interconnecting shaft, a clutch, a countershaft, a first and second set of gears, an output shaft and a first transfer gear is provided. The clutch is selectively engagable to couple the transmission input member with one of the first and second interconnecting shafts. The first set of gears are connected for common rotation with one of the first and second interconnecting shafts and intermesh with a first selectable set of gears to form a first plurality of co-planar gear sets. Each of the gears of the first selectable set of gears is connectable for common rotation with the countershaft for selectively transferring the torque to the countershaft when the clutch is engaged. The second set of gears are selectively connectable for common rotation with the other of the first and second interconnecting shafts and intermesh with a second set of gears connected for common rotation with the countershaft to form a second plurality of co-planar gear sets. The output shaft is disposed radially outward of the second interconnecting shaft. The first transfer gear is coupled to the countershaft for transferring torque from the countershaft to the output shaft.

The above features and advantages and other features and advantages of the present invention are readily apparent from the following detailed description of the best modes for carrying out the invention when taken in connection with the accompanying drawings.

DESCRIPTION

Figure 1:
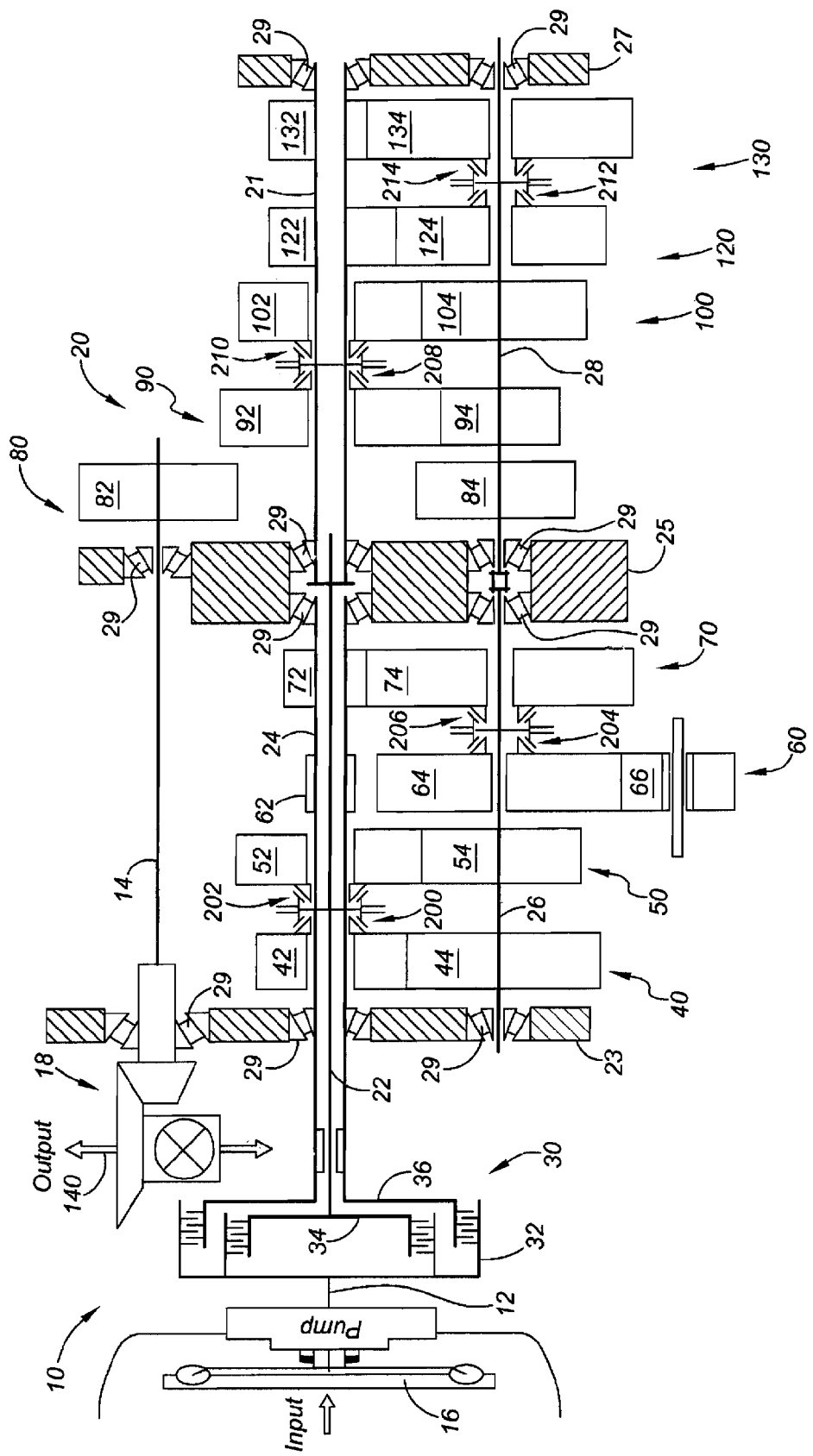
FIG. 1 is a schematic representation of an embodiment of a transmission in accordance with the present invention.

Referring to the drawings, wherein like reference numbers refer to like components, in FIG. 1 a multi-speed transmission 10 is depicted. The transmission 10 includes an input member 12 and output member 14. In the present embodiment, the input member 12 and the output member 14 are shafts, and will be referred to as such. However, those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes interconnecting shafts, countershafts, co-planar intermeshing gear sets and selectively engagable synchronizers as will be described herein. For example, the countershaft gearing arrangement 20 includes a first interconnecting shaft 22 and a second interconnecting shaft 24, which is a sleeve shaft concentric with the first interconnecting shaft 22. Further, an extension shaft or third interconnecting shaft 21 is coupled to and axially aligned with first interconnecting shaft 22. Alternatively, the present invention contemplates replacing the first interconnecting shaft 22 and the extension shaft 21 with a single shaft. Moreover, the countershaft gearing arrangement 20 further includes a first countershaft 26 and a second countershaft 28, which are axially aligned and coupled to one another. Countershafts 26 and 28 are both spaced from and parallel with the input shaft 12, the output shaft 14 and the interconnecting shafts 22, 24. Alternatively, the present invention contemplates replacing countershafts 26, 28 with a single countershaft.

The first and second interconnecting shafts 22, 24, first and second countershafts 26, 28 and output shaft 14 are supported by a first, second and third support structure or wall 23, 25, 27, respectively, formed in the housing of transmission 10. As conventionally known, the walls 23, 25, 27 are fitted with bearings 29 for rotatably supporting the first and second interconnecting shafts 22, 24, first and second countershafts 26, 28 and output shaft 14. Wall 23 is disposed closest to the torque converter 16 and the final drive unit 18. Wall 25 is disposed adjacent wall 23 and wall 27 is disposed adjacent wall 25.

A dual clutch 30 is connected between input shaft 12 and first and second interconnecting shafts 22, 24. The dual clutch 30 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32 connects the input shaft 12 for common rotation with first interconnecting shaft 22 and selective engagement of clutch element 36 with clutch housing 32 connects the input shaft 12 for common rotation with second interconnecting shaft 24.

The countershaft gearing arrangement 20 also includes co-planar, intermeshing gear sets 40, 50, 60, 70, 80, 90, 100, 120 and 130. Gear set 40 includes gears 42 and 44. Gear 42 is selectively connectable for common rotation with second interconnecting shaft 24 and intermeshes with gear 44. Gear 44 is connected for common rotation with first countershaft 26. As shown in FIG. 1, gear set 40 is disposed adjacent wall 23 and provides a fourth gear ratio.

Co-planar gear set 50 includes co-planar intermeshing gears 52 and 54. Gear 52 is selectively connectable for common rotation with interconnecting shaft 24 and intermeshes with gear 54. Gear 54 is connected for common rotation with first countershaft 26. As shown in FIG. 1, gear set 50 is disposed adjacent gear set 40 and provides a sixth gear ratio.

Gear set 60 includes co-planar intermeshing gears 62, 64 and 66. Gear 62 is connected for common rotation with second interconnecting shaft 24 and intermeshes with idler gear 66. Gear 64 is selectively connectable with first countershaft 26 and intermeshes with idler gear 66. Idler gear 66 is rotatable about idler axis 1. As shown in FIG. 1, gear set 60 is disposed adjacent gear set 50 and provides a reverse gear ratio.

Gear set 70 includes co-planar, intermeshing gears 72 and 74. Gear 72 is connected for common rotation with second interconnecting shaft 24. Gear 72 intermeshes with gear 74. Gear 74 is selectively connectable for common rotation with first countershaft 26. As shown in FIG. 1, gear set 70 is disposed adjacent gear set 60 and wall 25 and provides a second gear ratio.

Gear set 80 includes co-planar, intermeshing transfer gears 82 and 84. Gear 82 is connected for common rotation with output shaft 14. Gear 82 intermeshes with gear 84. Gear 84 is connected with second countershaft 28. As shown in FIG. 1, gear set 80 is disposed adjacent wall 25 and transfers torque from second countershaft 28 to output shaft 14

Gear set 90 includes co-planar intermeshing gears 92 and 94. Gear 92 is selectively connectable for common rotation with extension shaft 21. Gear 92 intermeshes with gear 94. Gear 94 is connected for common rotation with second countershaft 28. As shown in FIG. 1, gear set 90 is disposed adjacent gear set 80 and provides a seventh gear ratio.

Gear set 100 includes co-planar, intermeshing gears 102 and 104. Gear 102 is selectively connectable for common rotation with extension shaft 21. Gear 102 intermeshes with gear 104. Gear 104 is connected for common rotation with the second countershaft 28. As shown in FIG. 1, gear set 100 is disposed adjacent gear set 90 and provides a fifth gear ratio.

Gear set 120 includes co-planar, intermeshing gears 122 and 124. Gear 122 is connected for common rotation with extension shaft 21. Gear 122 intermeshes with gear 124. Gear 124 is selectively connectable for common rotation with the second countershaft 28. As shown in FIG. 1, gear set 120 is disposed adjacent gear set 100 and provides a third gear ratio.

Gear set 130 includes co-planar, intermeshing gears 132 and 134. Gear 132 is connected for common rotation with extension shaft 21. Gear 132 intermeshes with gear 134. Gear 134 is selectively connectable for common rotation with the second countershaft 28. As shown in FIG. 1, gear set 130 is disposed adjacent gear set 120 and wall 27 and provides a first gear ratio.

The transmission 10 further includes a plurality of selectively engagable synchronizers 200, 202, 204, 206, 208, 210, 212 and 214. Synchronizers 200/202, 204/206, 208/210 and 212/214 are a left and right side of synchronizer assemblies, sharing a common synchronizer hub and sleeve. Synchronizer 200 is selectively engagable to connect gear 42 with second interconnecting shaft 24 for common rotation therewith. Synchronizer 202 is selectively engagable to connect gear 52 with second interconnecting shaft 24 for common rotation therewith. Synchronizer 204 is selectively engagable to connect gear 64 with first countershaft 26 for common rotation therewith. Synchronizer 206 is selectively engagable to connect gear 74 with first countershaft 26 for common rotation therewith. Synchronizer 208 is selectively engagable to connect gear 92 with extension shaft 21 for common rotation therewith. Synchronizer 210 is selectively engagable to connect gear 102 with extension shaft 21 for common rotation therewith. Synchronizer 212 is selectively engagable to connect gear 124 with second countershaft 28 for common rotation therewith. Synchronizer 214 is selectively engagable to connect gear 134 with second countershaft 28 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 200, 202, 204, 206, 208, 210, 212 and 214. Those skilled in the art will readily understand that a different speed ratio is associated with each torque ratio.

To establish the reverse torque ratio clutch element 36 of the dual clutch 30 and synchronizer 204 are engaged. By the engagement of clutch element 36 of the dual clutch 30, torque is transferred from the input shaft 12 through clutch housing 32 to the second interconnecting shaft 24. Further, torque is transferred from the second interconnecting shaft 24 through gear 62 to idler gear 66. Idler gear 66 transfers the torque to gear 64. Upon engagement of synchronizer 204, gear 64 transfers torque to first countershaft 26. First countershaft 26 transfers the torque to transfer gear 84. Transfer gear 84 transfers torque to transfer gear 82, which in turn transfers the torque to output shaft 14. Output shaft 14 transfers the torque to the final drive unit 18.

A first forward torque ratio (1st gear) is achieved by engaging clutch element 34 of the dual clutch 30 and synchronizer 214. By the engagement of clutch element 34 of the dual clutch 30, torque is transferred from input shaft 12 through clutch housing 32 to the first interconnecting shaft 22 and extension shaft 21. Further, torque is transferred from extension shaft 21 to gear 132. Gear 132 transfers the torque to gear 134. Upon engagement of synchronizer 214, gear 134 transfers torque to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

A subsequent forward torque ratio (2nd gear) is established by engagement of clutch element 36 of the dual clutch 30 and synchronizer 206. By the engagement of clutch element 36 of the dual clutch 30, torque is transferred from input shaft 12 through clutch housing 32 to the second interconnecting shaft 24. Further, torque is transferred from the second interconnecting shaft 24 to gear 72. Gear 72 transfers the torque to gear 74. Upon engagement of synchronizer 206, gear 74 transfers torque to first countershaft 26. First countershaft 26 transfers the torque to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

The subsequent torque ratio (3rd gear) is established by engagement of clutch element 34 of the dual clutch 30 and synchronizer 212. By the engagement of clutch element 34 of the dual clutch 30, torque is transferred from input shaft 12 through clutch housing 32 to the first interconnecting shaft 22 and extension shaft 21. Further, torque is transferred from the extension shaft 21 to gear 122. Gear 122 transfers the torque to gear 124. Upon engagement of synchronizer 124, torque is transferred from gear 124 to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

The next subsequent forward torque ratio (4th gear) is established by engagement of clutch element 36 of the dual clutch 30 and synchronizer 200. By the engagement of clutch element 36 of the dual clutch 30 and synchronizer 200, torque is transferred from input shaft 12 through clutch housing 32 to the second interconnecting shaft 24. Further, torque is transferred from the second interconnecting shaft 24 to gear 42. Gear 42 transfers the torque to gear 44. Gear 44 transfers the torque to first countershaft 26. First countershaft 26 transfers the torque to second countershaft 28. Second countershaft 28 transfers the torque to transfer gear 84. Transfer gear 84 transfers the torque to transfer gear 82, which in turn transfers the torque to output shaft 14. Output shaft 14 transfers the torque to the final drive unit 18.

The subsequent torque ratio (5th gear) is established by engagement of clutch element 34 of the dual clutch 30 and synchronizer 210. By the engagement of clutch element 34 of the dual clutch 30, torque is transferred from input shaft 12 through clutch housing 32 to the first interconnecting shaft 22 and extension shaft 21. Further, upon engagement of synchronizer 210 torque is transferred from the extension shaft 21 to gear 102. Gear 102 transfers the torque to gear 104. Gear 104 transfers torque to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

A subsequent forward torque ratio (6th gear) is established by engagement of clutch element 36 of the dual clutch 30 and synchronizer 202. By the engagement of clutch element 36 of the dual clutch 30, torque is transferred from input shaft 12 through clutch housing 32 to the second interconnecting shaft 24. Further, upon engagement of synchronizer 202 torque is transferred from the second interconnecting shaft 24 to gear 52. Gear 52 transfers the torque to gear 54. Gear 54 transfers the torque to first countershaft 26. First countershaft 26 transfers the torque to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

The subsequent torque ratio (7th gear) is established by engagement of clutch element 34 of the dual clutch 30 and synchronizer 208. By the engagement of clutch element 34 of the dual clutch 30, torque is transferred from input shaft 12 through clutch housing 32 to the first interconnecting shaft 22 and extension shaft 21. Further, upon engagement of synchronizer 208, torque is transferred from the extension shaft 21 to gear 92. Gear 92 transfers the torque to gear 94. Gear 94 transfers the torque to second countershaft 28. Second countershaft 28 transfers the torque to transfer gear 84. Transfer gear 84 transfers torque to transfer gear 82, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 82, 84 in one plane. This arrangement provides the opportunity to achieve the desired gear ratios. Further, flexibility is provided in the selection of gear ratios with respect to 1st gear and 7th gear, as the gears (132, 134, 92 and 94) that provide these ratios are disposed in two separate planes. An overall transmission length reduction is achieved through the use of idler gear 66.

Figure 2:
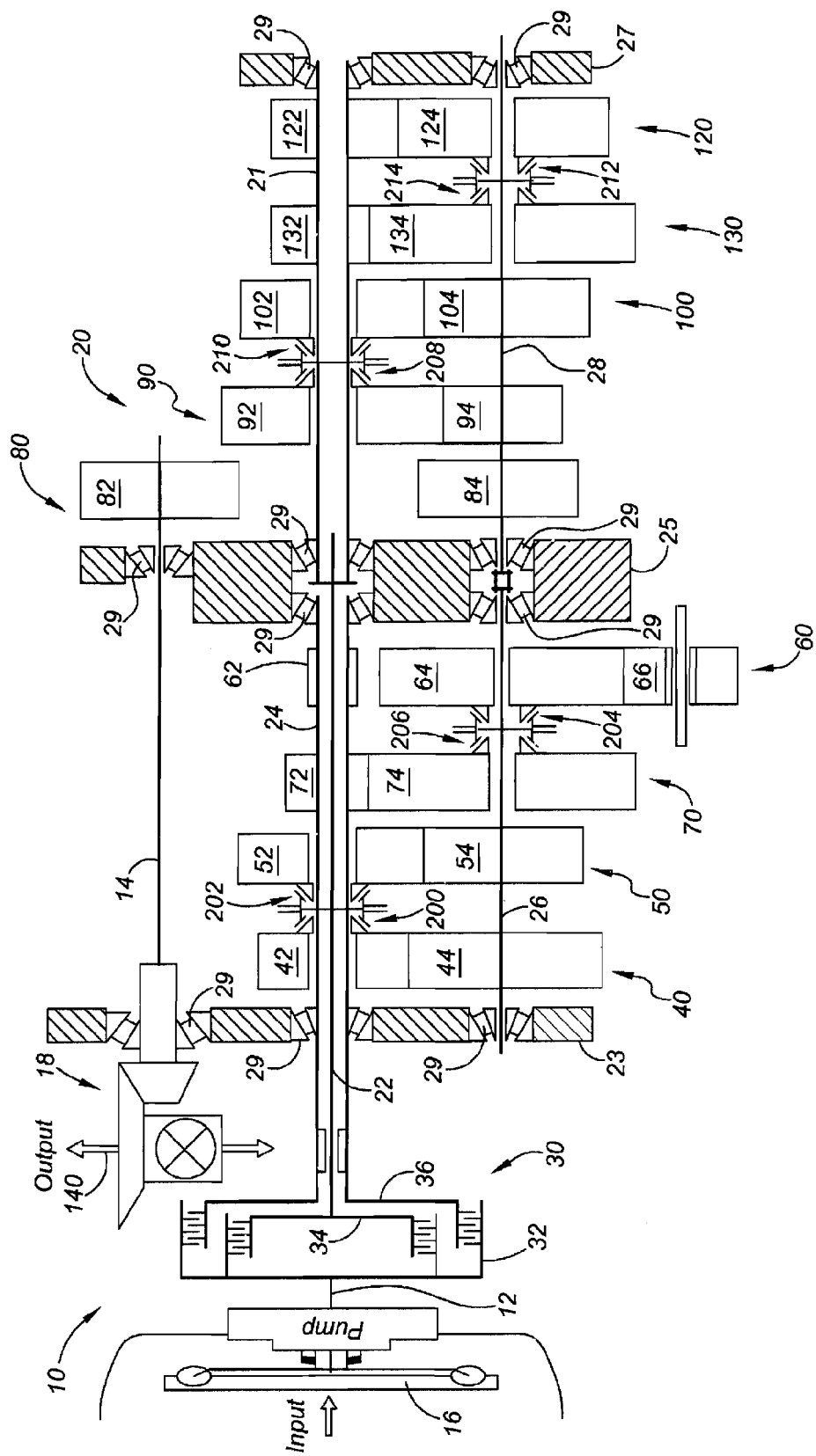
FIG. 2 is a schematic representation of another embodiment of a transmission in accordance with the present invention.

With reference to FIG. 2, an alternate arrangement of the transmission 10 is shown. In this arrangement of the transmission 10, gear set 40 is adjacent wall 23, gear set 50 is adjacent gear set 40, gear set 70 is adjacent gear set 50, gear set 60 is between gear set 70 and wall 25, gear set 80 is adjacent wall 25, gear set 90 is adjacent gear set 80, gear set 100 is adjacent gear set 90, gear set 130 is adjacent gear set 100, and gear set 120 is between gear set 130 and wall 27.

Accordingly, the present embodiments of the invention have many advantages and benefits over the prior art. For example, the transmission of the present invention provides the final drive unit 18 with a final drive unit output shaft 140. Moreover, the final drive unit output shaft 140 is transverse to input member 12 and is disposed between clutch 30 and transmission housing wall 23.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an input member;
   a torque converter continuously connected with the input member;
   an output member;
   a first, second, third, fourth, fifth, sixth, seventh, eighth, and ninth gear set each having a first gear and a second gear, wherein the output member is continuously connected with one of the gear sets;
   a first interconnecting member continuously connected to the eighth and ninth gear sets;
   a second interconnecting member continuously connected with the third and fourth gear sets;
   a countershaft continuously connected to the first, second, fifth, sixth, and seventh gear sets;
   a dual clutch assembly selectively engageable to interconnect the input member with one of the first interconnecting member and the second interconnecting member; and
   four synchronizer assemblies for selectively coupling one of the first, second, third, fourth, sixth, seventh, eighth, and ninth gear sets with one of the first interconnecting member, second interconnecting member, and the countershaft, and
   wherein the dual clutch assembly and four synchronizer assemblies are selectively engageable in combinations of at least two to establish at least seven forward speed ratios and at least one reverse speed ratio between the input member and the output member.

2. The transmission of claim 1 wherein the countershaft is located radially outward from and parallel to the input member.

3. The transmission of claim 2 wherein the output member is located radially outward from and parallel to the input member.

4. The transmission of claim 3 wherein the first interconnecting member is concentric with the second interconnecting member.

5. The transmission of claim 1 wherein the dual clutch assembly includes a first clutch for selectively connecting the input member with the first interconnecting member and a second clutch for selectively connecting the input member with the second interconnecting member.

6. The transmission of claim 1 wherein the output member is continuously connected with the fifth gear set.

7. The transmission of claim 1 wherein the first gear and second gear within each of the first, second, third, fourth, fifth, sixth, seventh, eighth, and ninth gear sets are radially aligned.

8. The transmission of claim 7 wherein the third gear set includes a third gear rotatable about an axis radially outward from and parallel to the countershaft, and wherein the third gear of the third gear set is intermeshed with the first gear and the second gear of the third gear set.

9. The transmission of claim 8 wherein the first gear of the fifth gear set is continuously connected to the output member.

10. The transmission of claim 9 wherein the first, second, and third gears of the third gear set and the first and second gears of the fifth gear set are radially aligned.

11. The transmission of claim 1 wherein a first of the four synchronizer assemblies selectively connects one of the first gear set and the second gear set to the second interconnecting member.

12. The transmission of claim 11 wherein a second of the four synchronizer assemblies selectively connects one of the third gear set and the fourth gear set to the countershaft.

13. The transmission of claim 12 wherein a third of the four synchronizer assemblies selectively connects one of the sixth gear set and the seventh gear set to the first interconnecting member.

14. The transmission of claim 13 wherein a fourth of the four synchronizer assemblies selectively connects one of the eighth gear set and the ninth gear set to the countershaft.

15. The transmission of claim 1 wherein the first gears of the first, second, fourth, sixth, seventh, eighth, and ninth gear sets are intermeshed with the second gears of the first, second, fourth, sixth, seventh, eighth, and ninth gear sets, respectively, and wherein the first gears of the first, second, third, fourth, sixth, seventh, eighth, and ninth gear sets are connectable with at least one of the first interconnecting member and the second interconnecting member and wherein the second gears of the first, second, third, fourth, fifth, sixth, seventh, eighth, and ninth are connectable with the countershaft.

16. The transmission of claim 1 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, the eighth gear set is adjacent the seventh gear set, and the ninth gear set is adjacent the eighth gear set.

17. The transmission of claim 1 wherein the first gear set is adjacent the dual clutch assembly, the second gear set is adjacent the first gear set, the fourth gear set is adjacent the second gear set, the third gear set is adjacent the fourth gear set, the fifth gear set is adjacent the third gear set, the sixth gear set is adjacent the fifth gear set, the seventh gear set is adjacent the sixth gear set, the ninth gear set is adjacent the seventh gear set, and the eighth gear set is adjacent the ninth gear set.

18. The transmission of claim 1 wherein the first interconnecting member includes a first shaft coupled to and axially aligned with a second shaft, and wherein the dual clutch assembly is coupled to the first shaft and the sixth, seventh, eighth, and ninth gear sets are connectable with the second shaft.

19. The transmission of claim 18 wherein the countershaft includes a first countershaft portion coupled to and axially aligned with a second countershaft portion, and wherein the first, second, third, and fourth gear sets are connectable with the first countershaft portion and the fifth, sixth, seventh, eighth, and ninth gear sets are connectable with the second countershaft portion.

20. A transmission comprising:
an input member;
an output member;
a first, second, third, fourth, fifth, sixth, seventh, eighth, and ninth gear set each having a first gear and a second gear, wherein the output member is continuously connected with one of the gear sets, and wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, the eighth gear set is adjacent the seventh gear set, and the ninth gear set is adjacent the eighth gear set;
a first interconnecting member continuously connected to the eighth and ninth gear sets;
a second interconnecting member continuously connected with the third and fourth gear sets;
a countershaft continuously connected to the first, second, fifth, sixth, and seventh gear sets;
a dual clutch assembly selectively engageable to interconnect the input member with one of the second interconnecting member and the first end of the first interconnecting member;
a first synchronizer assembly selectively engageable to interconnect one of the first gear set and the second gear set to the second interconnecting member;
a second synchronizer assembly selectively engageable to interconnect one of the third gear set and the fourth gear set to the countershaft;
a third synchronizer assembly selectively engageable to interconnect one of the sixth gear set and the seventh gear set to the first interconnecting member; and
a fourth synchronizer assembly selectively engageable to interconnect one of the eighth gear set and the ninth gear set to the countershaft, and
wherein the dual clutch assembly and the first, second, third, and fourth synchronizer assemblies are selectively engageable in combinations of at least two to establish at least seven forward speed ratios and at least one reverse speed ratio between the input member and the output member.

21. The transmission of claim 20 wherein the first gear and second gear within each of the first, second, third, fourth, fifth, sixth, seventh, eighth, and ninth gear sets are radially aligned, wherein the third gear set includes a third gear rotatable about an axis radially outward from and parallel to the countershaft, the third gear of the third gear set intermeshed with the first gear and the second gear of the third gear set, and wherein the first, second, and third gears of the third gear set are radially aligned.

22. The transmission of claim 21 wherein the first gears of the first, second, fourth, fifth, sixth, seventh, eighth, and ninth gear sets are intermeshed with the second gears of the first, second, fourth, fifth, sixth, seventh, eighth, and ninth gear sets, and wherein the first gears of the first, second, third, fourth, sixth, seventh, eighth, and ninth gear sets are connectable with at least one of the first interconnecting member and the second interconnecting member and wherein the second gears of the first, second, third, fourth, sixth, seventh, eighth, and ninth gear sets are connectable with the countershaft.

23. A transmission comprising:
an input member;
an output member;
a first, second, third, fourth, fifth, sixth, seventh, eighth, and ninth gear set each having a first gear and a second gear, wherein the output member is continuously connected with one of the gear sets, and wherein the first gear set is adjacent the dual clutch assembly, the second gear set is adjacent the first gear set, the fourth gear set is adjacent the second gear set, the third gear set is adjacent the fourth gear set, the fifth gear set is adjacent the third gear set, the sixth gear set is adjacent the fifth gear set, the seventh gear set is adjacent the sixth gear set, the ninth gear set is adjacent the seventh gear set, and the eighth gear set is adjacent the ninth gear set
a first interconnecting member continuously connected to the eighth and ninth gear;
a second interconnecting member continuously connected with the third and fourth gear sets;
a countershaft continuously connected to the first, second, fifth, sixth, and seventh gear sets;
a dual clutch assembly selectively engageable to interconnect the input member with one of the second interconnecting member and the first interconnecting member;

a first synchronizer assembly selectively engageable to interconnect one of the first gear set and the second gear set to the second interconnecting member;
a second synchronizer assembly selectively engageable to interconnect one of the third gear set and the fourth gear set to the countershaft;
a third synchronizer assembly selectively engageable to interconnect one of the sixth gear set and the seventh gear set to the first interconnecting member; and
a fourth synchronizer assembly selectively engageable to interconnect one of the eighth gear set and the ninth gear set to the countershaft, and
wherein the dual clutch assembly and the first, second, third, and fourth synchronizer assemblies are selectively engageable in combinations of at least two to establish at least seven forward speed ratios and at least one reverse speed ratio between the input member and the output member.

24. The transmission of claim 23 wherein the first gear and second gear within each of the first, second, third, fourth, fifth, sixth, seventh, eighth, and ninth gear sets are radially aligned, wherein the third gear set includes a third gear rotatable about an axis radially outward from and parallel to the countershaft, the third gear of the third gear set intermeshed with the first gear and the second gear of the third gear set, and wherein the first, second, and third gears of the third gear set are radially aligned.

25. The transmission of claim 24 wherein the first gears of the first, second, fourth, fifth, sixth, seventh, eighth, and ninth gear sets are intermeshed with the second gears of the first, second, fourth, fifth, sixth, seventh, eighth, and ninth gear sets, and wherein the first gears of the first, second, third, fourth, sixth, seventh, eighth, and ninth gear sets are connectable with at least one of the first interconnecting member and the second interconnecting member and wherein the second gears of the first, second, third, fourth, sixth, seventh, eighth, and ninth gear sets are connectable with the countershaft.

\* \* \* \* \*